F. LAKE.
HAY RAKE AND RACKER.
APPLICATION FILED SEPT. 9, 1916.
1,342,293.
Patented June 1, 1920.
2 SHEETS—SHEET 1.
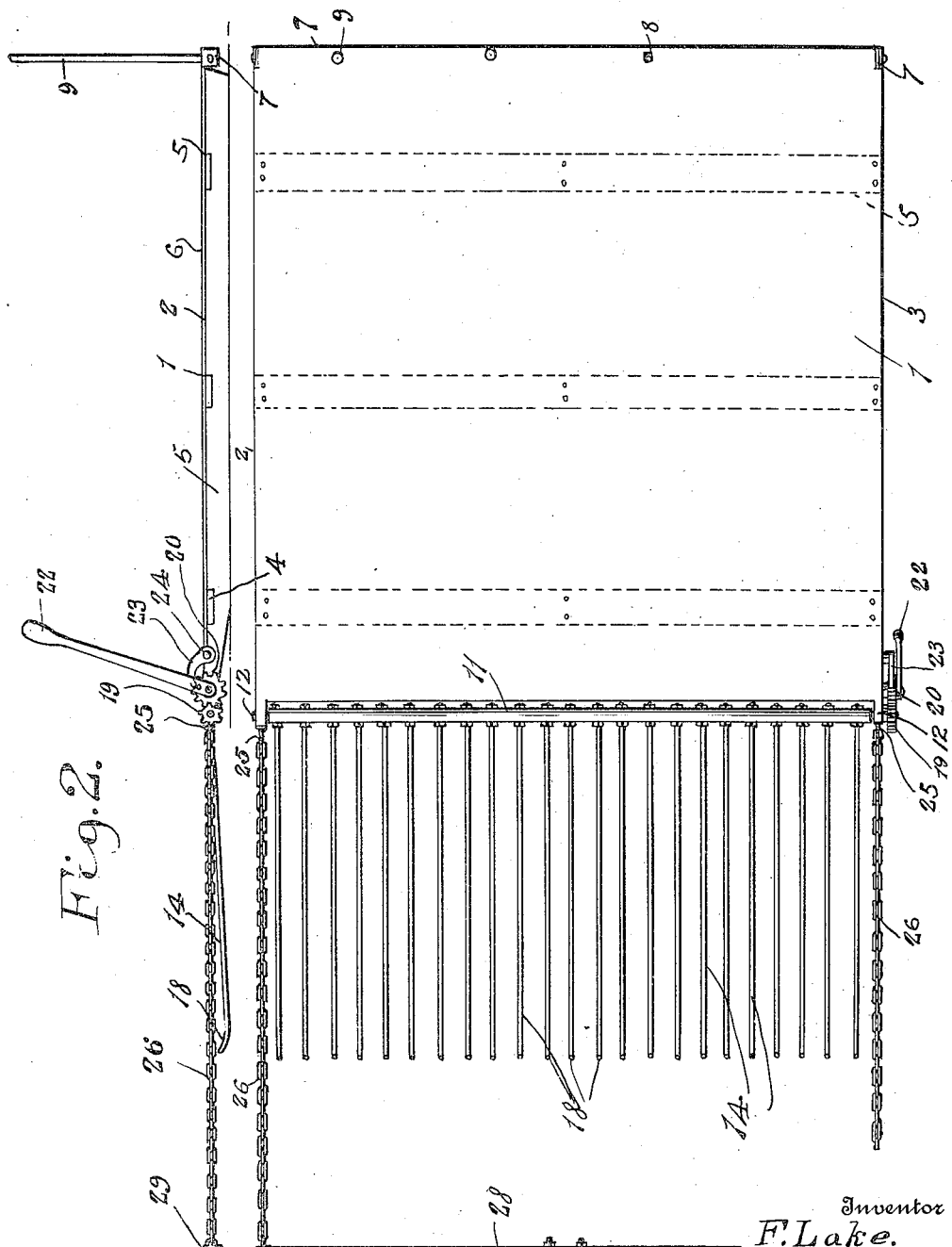
Inventor
F. Lake.
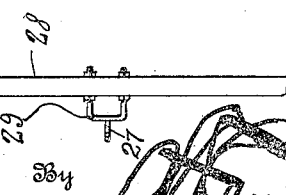

F. LAKE.
HAY RAKE AND RACKER.
APPLICATION FILED SEPT. 9, 1916.
1,342,293.
Patented June 1, 1920.
2 SHEETS—SHEET 2.
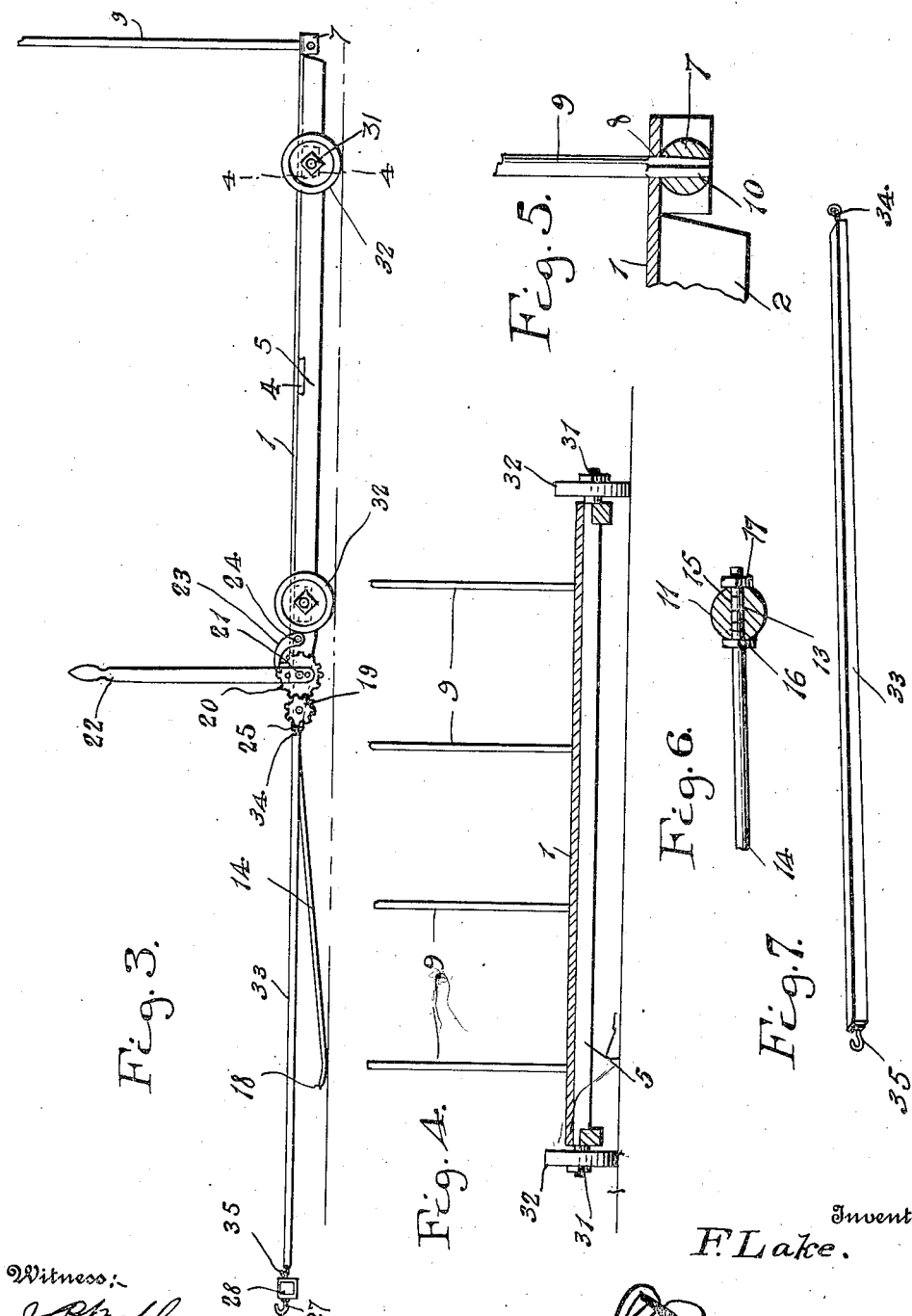
Inventor
F. Lake.
Witness:—
By 
Attorney

UNITED STATES PATENT OFFICE.

FRANK LAKE, OF MIAMI, ARIZONA.

HAY RAKE AND RACKER.

1,342,293.  Specification of Letters Patent.  Patented June 1, 1920.

Application filed September 9, 1916. Serial No. 119,324.

*To all whom it may concern:*

Be it known that I, FRANK LAKE, a citizen of the United States, residing at Miami, in the county of Gila and State of Arizona, have invented certain new and useful Improvements in Hay Rakes and Rackers; and I do hereby declare the following to be a full, clear, and exact description of the invention, such as will enable others skilled in the art to which it appertains to make and use the same.

This invention relates to improvements in hay rakes.

The object of this invention is to provide a rake of this character more particularly adapted for gathering hay, weeds, brush and the like, of the drag class, and adapted to deliver the same from one point to another.

A further object of this invention is to provide a hay rake comprising a platform on which is journaled a shaft carrying a plurality of raking tines which are adapted to be regulated by a lever for adjusting the throw of the same from the ground and is adapted to force the hay up on the platform so that the same can be carried from the field to any desired point.

A further object of this invention is to provide a hay rake and racker of this character which will be simple, practical and comparatively inexpensive in construction, and one that can be manufactured and sold at a comparatively small cost.

With these and other objects in view the invention consists in the novel combination and arrangement of parts hereinafter more fully described and set forth in the claim hereto appended.

In the drawings:

Figure 1 is a top plan view of my improved hay racker and rake made in accordance with this invention, Fig. 2 is an end view of the same, Fig. 3 is an end view of a slightly modified form of my invention, and Fig. 4 is a transverse sectional view taken on the line 4—4 of Fig. 3, Fig. 5 is a detail sectional view disclosing the manner in which the bars are removably secured to the platform, Fig. 6 is a detail view of the manner in which the tines are removably secured to the shaft, and Fig. 7 is a perspective view of the backing bar.

Like numerals of reference designate corresponding parts in all the figures of the drawings.

Referring more particularly to the drawings, the numeral 1 designates the platform in its entirety and comprises in its construction the runners 2 and 3 which are provided on their upper face with recesses 4 at spaced distances apart, which recesses 4 have secured therein the transversely extending bars 5, which bars form the body of the platform. Secured over the platform is the cover 6, which cover is formed of tin or any other suitable material to form a smooth surface.

Secured to the rear end of the platform 6 and extending transversely across the same is the rod 7, which is provided with a plurality of spaced rectangular openings 8 in which are adapted to be removably secured stop bars 9, which bars have their lower ends squared as at 10, for frictionally engaging the rectangular openings 8 of the member 7 so as to prevent the contents of the platform from being forced thereoff during the operation of the rake.

A shaft 11 substantially circular in cross section and provided with trunnions 12 at opposite ends is journaled in the runners 2 and 3 at the forward ends thereof. The shaft 11 is provided with a plurality of spaced circular openings 13 through which are adapted to extend one end of the rake tines 14. The inner ends of the rake tines 14 are screw threaded as at 15 and are provided near their ends with a stop collar 16, and the screw threaded portions 15 are adapted to extend through the openings 13 of the shaft 11 and are secured against accidental displacement by a nut 17, which nut permits the removal of the tines should the same become broken or worn.

The forward ends of the tines 14 are curved upwardly as at 18 and are pointed to facilitate the ready sliding movement of the tines under the hay, weeds, or the like to force the same back on the platform 6.

Carried by one end of the shaft 11 and located on the outside of the runner 3 is a gear wheel 19, which is adapted to mesh with the ratchet wheel 20 which is journaled on the stub shaft 21, which stub shaft is secured to the runer 3 near its forward end. Secured to the ratchet wheel is a lever 22 which lever is adapted to regulate the movement of the times 14 for moving the same upwardly or downwardly and adjust the same with relation to the ground.

To secure the ratchet 20 against backward rotation there is provided a pawl 23 which is pivotally secured to the runners 3 as at 24. This pawl is adapted to have engagement with the ratchet wheel 21 and prevent accidental rotation of the same and also hold the tines 14 in their adjusted position.

The forward ends of the runners 2 and 3 are provided with eyes 25 which are secured at one end of the chains 26 which are provided at their outer ends with swivel hooks 27 which are adapted to be connected to the opposite ends of the connecting bar 28, which is provided with a keeper 29 to which is secured a whiffletree for the attaching of the horses thereto for pulling the rake when in use.

In Fig. 3 of the drawings there is shown a slightly modified form of my invention which is identical in construction with Fig. 1 only it is provided with axles 31 which are journaled to the forward and rearward transverse bar 5 and are provided with wheels 32 to take the place of runners 2.

A backing bar 33 has an eye at one end designated as 34 and a hook at its opposite end 35. The hook 35 is adapted to be connected to the eyes 25 and take the place of the flexible chains 26 so that the platform may be readily backed to the stack when the device is in use.

In operation, the horses are hitched to the bar 28 by the clevis 29 which is attached to a whiffletree and the device is dragged over the field and the tines 14 having their peculiarly curved ends 18 force the hay up to the platform 6 until the same is filled, and the device moved over to a hay stack and the bars 9 removed and the hay taken from the platform 6, and the bars 9 replaced and the device is ready for another operation.

What is claimed is:

A hay rack comprising a platform, vertically disposed bars detachably mounted upon the platform at the rear portion thereof, a shaft journaled at the forward edge of the platform, the tines carried by the shaft, intermeshing gear wheels one of which is journaled upon the platform and the other fixed to the said shaft, a lever attached to the gear wheel which is mounted upon the platform and adapted to be used for turning the same and a pawl pivotally mounted upon the platform and engageable with the gear wheel which is journaled thereon and to which the lever is attached.

In testimony whereof I affix my signature.

FRANK LAKE.